US008714795B2

(12) United States Patent
Uchida

(10) Patent No.: US 8,714,795 B2
(45) Date of Patent: May 6, 2014

(54) VEHICLE HEADLAMP

(75) Inventor: Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 104 days.

(21) Appl. No.: 13/359,539

(22) Filed: Jan. 27, 2012

(65) Prior Publication Data

US 2012/0195058 A1 Aug. 2, 2012

(30) Foreign Application Priority Data

Jan. 27, 2011 (JP) ................................ 2011-015219

(51) Int. Cl.

| | |
|---|---|
| ***F21V 5/00*** | (2006.01) |
| ***B60Q 1/00*** | (2006.01) |
| ***B60Q 3/00*** | (2006.01) |
| ***F21S 8/10*** | (2006.01) |
| ***F21V 21/00*** | (2006.01) |

(52) U.S. Cl.

USPC ............................ 362/538; 362/520; 362/545

(58) Field of Classification Search

USPC ......... 362/543–545, 547, 549, 539, 516–522, 362/538

See application file for complete search history.

(56) References Cited

U.S. PATENT DOCUMENTS

| | | | | |
|---|---|---|---|---|
| 5,086,376 | A * | 2/1992 | Blusseau | 362/518 |
| 5,997,163 | A * | 12/1999 | Brown | 362/553 |
| 6,543,922 | B2 * | 4/2003 | Komatsu et al. | 362/518 |
| 7,128,455 | B2 * | 10/2006 | Yamamura | 362/539 |
| 7,201,506 | B2 | 4/2007 | Ishida et al. | |
| 7,736,039 | B2 * | 6/2010 | Nakazawa et al. | 362/544 |
| 2003/0067786 | A1 * | 4/2003 | Begemann et al. | 362/543 |
| 2008/0225539 | A1 * | 9/2008 | Fujiwara et al. | 362/507 |
| 2008/0316759 | A1 * | 12/2008 | Valcamp et al. | 362/507 |

FOREIGN PATENT DOCUMENTS

JP 2005-141917 A 6/2005

* cited by examiner

*Primary Examiner* — Peggy Neils

*Assistant Examiner* — Erin Kryukova

(74) *Attorney, Agent, or Firm* — Osha Liang LLP

(57) ABSTRACT

A vehicle headlamp has a focused-beam lamp unit, and a diffused-beam lamp unit. The focused-beam lamp unit has a first semiconductor light emitting device having a first rectangular light emitting surface, and a first optical member that projects light from the first semiconductor light emitting device to form a focused beam pattern. The diffused-beam lamp unit has a second semiconductor light emitting device having a second rectangular light emitting surface, and a second optical member that projects light from the second semiconductor light emitting device to form a diffused beam pattern, the diffused beam pattern being wider than the focused beam pattern in a direction along a vertical line in front a vehicle on which the vehicle headlamp is mounted. The focused-beam lamp unit and the diffused-beam lamp unit are arranged to form a light distribution pattern by combining the focused beam pattern and the diffused beam pattern.

7 Claims, 6 Drawing Sheets

VEHICLE HEADLAMP

BACKGROUND OF INVENTION

1. Cross-Reference to Related Applications

The present application claims priority from Japanese Patent Application No. 2011-015219 filed on Jan. 27, 2011, the entire content of which is incorporated herein by reference.

2. Field of the Invention

The present invention relates to a vehicle headlamp including a plurality of lamp units, each having a semiconductor light emitting device, such as an LED, as a light source, to form a light distribution pattern by superimposing light beams from the lamp units.

3. Related Art

In recent years, vehicle headlamps using semiconductor light emitting devices as a light source are being proposed. Generally, the semiconductor light emitting devices are light emitting chips, such as light emitting diodes (LEDs), having a square light emitting surface.

From a viewpoint of safety, vehicle headlamps may be required to form a light distribution pattern with high accuracy. Such a light distribution pattern is formed by an optical system including optical members, for example, a reflector and a projection lens.

A related art vehicle headlamp forms a light distribution pattern (e.g., a low-beam light distribution pattern) by a combination of a plurality of focused-beam lamp units and a plurality of diffused-beam lamp units, each of the lamp units having a semiconductor light emitting device as a light source (see, e.g., JP 2005-141917 A). The focused-beam lamp units form a focused beam pattern by projecting a plurality of light source images of light emitting surfaces of their semiconductor light emitting devices in a forward direction from the headlamp. The diffused-beam lamp units form a diffused beam pattern by projecting a plurality of light source images of light emitting surfaces of their semiconductor light emitting devices in the forward direction from the headlamp.

The diffused beam pattern is wider than the focused beam pattern in the vertical direction. According to the related art vehicle headlamp, the horizontal light diffusion and the vertical light diffusion are both controlled by optical members, such as a reflector and a projection lens, to form the diffused beam pattern. This light distribution control is complex.

To form the focused beam pattern, the light source images are condensed toward a cutoff line of the pattern so as to form a hot zone. However, this may cause an unnecessary brightness below the hot zone, or a strong irregularity in light intensity.

SUMMARY OF INVENTION

One or more embodiments of the present invention provides a vehicle headlamp enabling a simplified light distribution control light intensity and less prone to cause irregularity in light intensity.

According to one or more embodiments of the present invention, a vehicle headlamp is provided. The vehicle headlamp includes a focused-beam lamp unit and a diffused-beam lamp unit. The focused-beam lamp unit includes a first semiconductor light emitting device having a first rectangular light emitting surface, and a first optical member via which light from the first semiconductor light emitting device is projected forward from the focused-beam lamp unit to form a focused beam pattern. The diffused-beam lamp unit includes a second semiconductor light emitting device having a second rectangular light emitting surface, and a second optical member via which light from the second semiconductor light emitting device is projected forward from the diffused-beam lamp unit to form a diffused beam pattern. The diffused beam pattern is wider than the focused beam pattern in a direction along a vertical line in front a vehicle on which the vehicle headlamp is mounted. The focused-beam lamp unit and the diffused-beam lamp unit are arranged to form a light distribution pattern by combining the focused beam pattern and the diffused beam pattern. The focused-beam lamp unit is configured to form the focused beam pattern by a plurality of first light source images of the first rectangular light emitting surface, at least one of the first light source images being longer in a direction along a laterally extending horizontal line in front of the vehicle than in the direction along the vertical line. The diffused-beam lamp unit is configured to form the diffused beam pattern by a plurality of second light source images of the second rectangular light emitting surface, at least one of the second light source images being longer in the direction along the vertical line than in the direction the horizontal line.

Other aspects and advantages of the invention will be apparent from the following description, the drawings and the claims.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
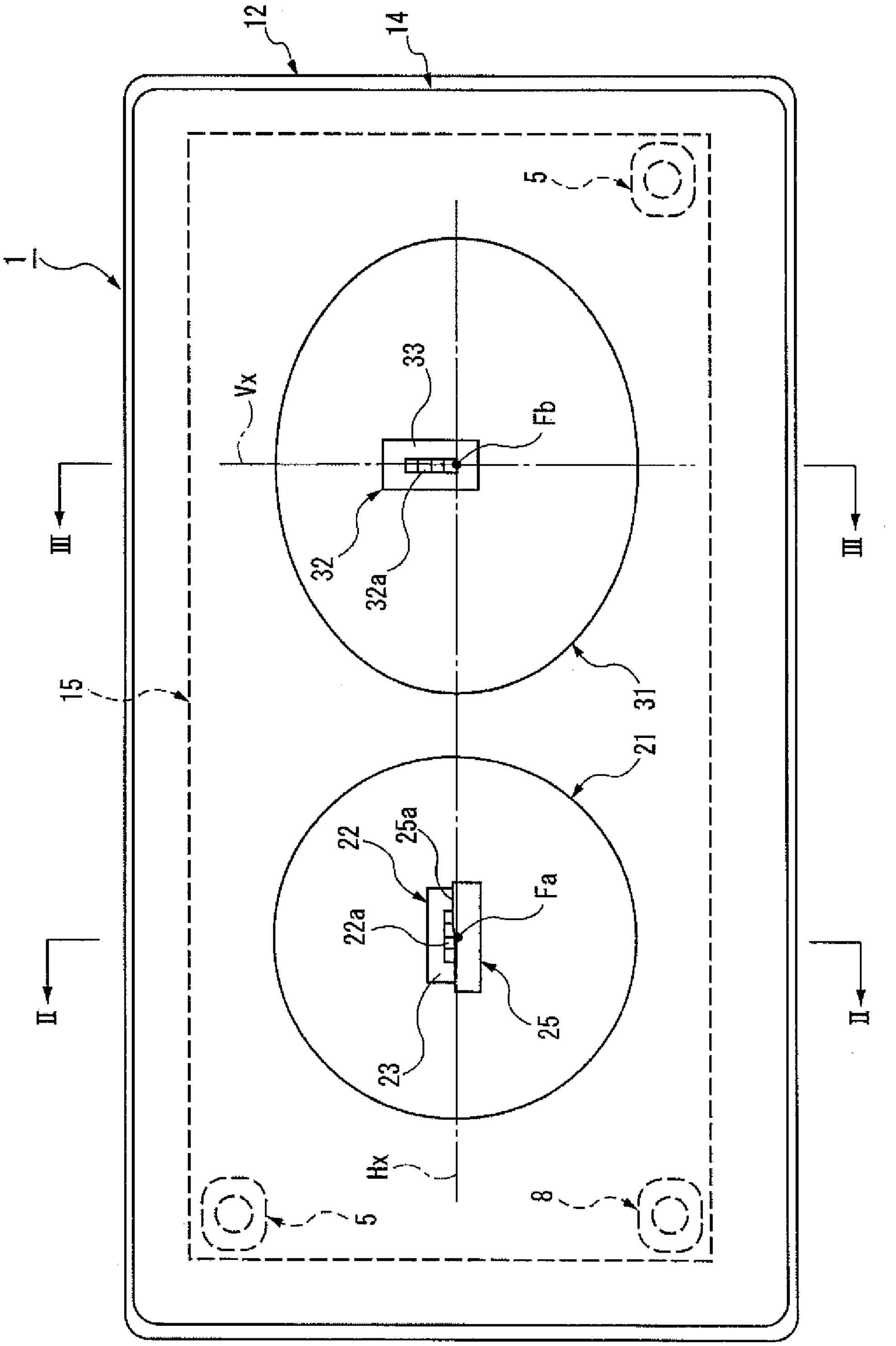
FIG. 1 is a general front view of a vehicle headlamp according to one or more embodiments of the present invention.
Figure 2:
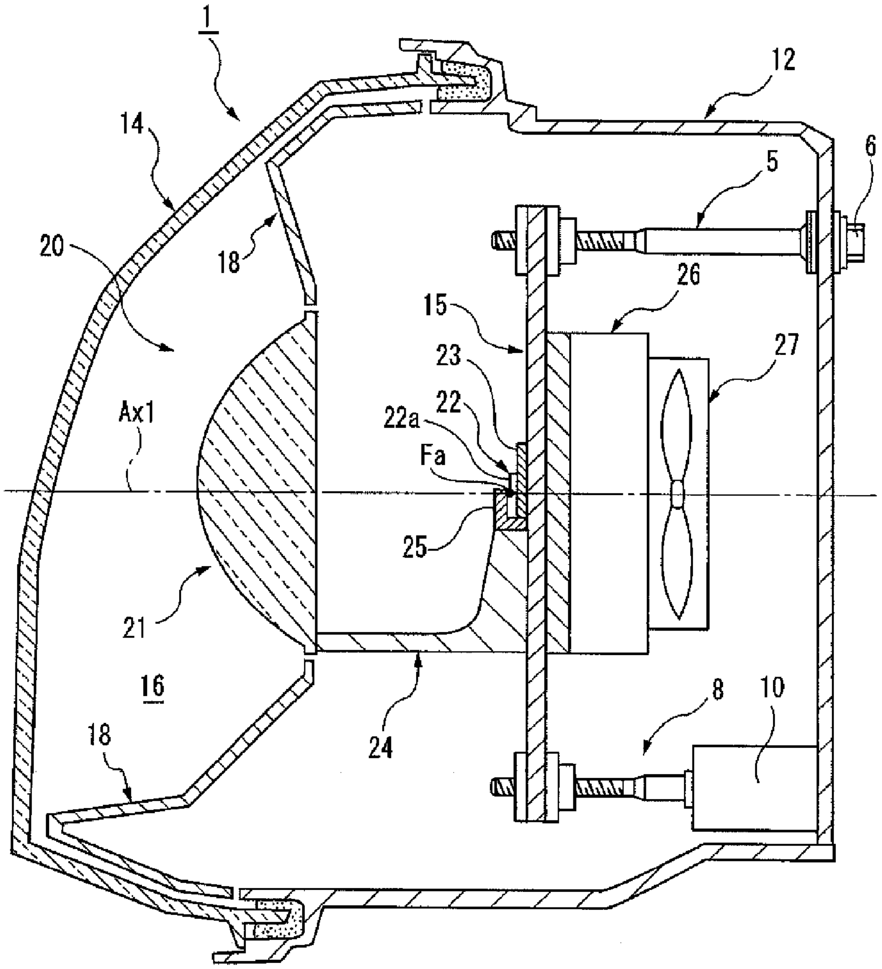
FIG. 2 is a sectional view of the vehicle headlamp, taken along line II-II shown in FIG. 1.
Figure 3:
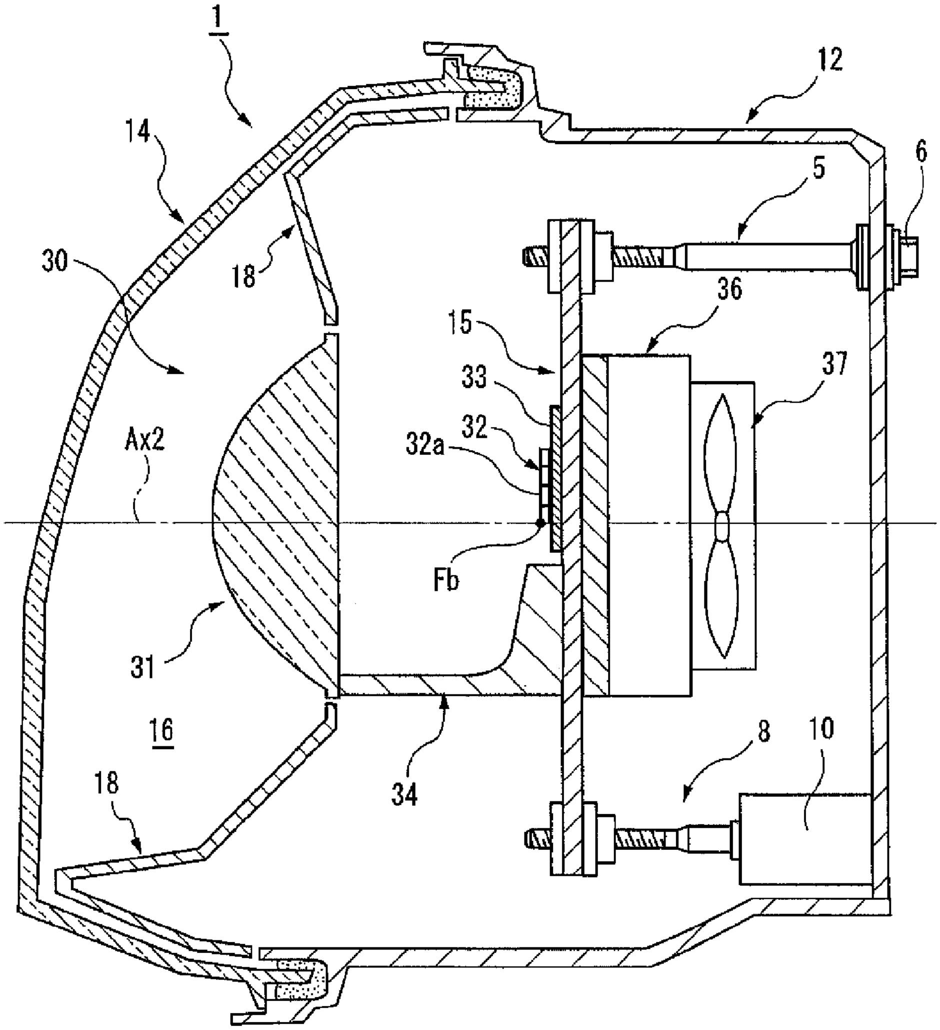
FIG. 3 is a sectional view of the vehicle headlamp, taken along line II-III shown in FIG. 1.

FIGS. 1 to 3 illustrate a vehicle headlamp 1 according to one or more embodiments of the present invention. The headlamp 1 is mounted on a front end portion of a vehicle, and is capable of forming, for example, a low beam.

The vehicle headlamp 1 includes a lamp body 12, a transparent cover 14 attached to a front opening portion of the lamp body 12 to form a lamp chamber 16, a focused-beam lamp unit 20, and a diffused-beam lamp unit 30. The focused-beam lamp unit 20 and the diffused-beam lamp unit 30 are accommodated inside the lamp chamber 16, and form a low-beam light distribution pattern by superimposing light beams from the respective lamp units 20, 30.

The focused-beam lamp unit 20 and the diffused-beam lamp unit 30 are fixed to a support member 15. An extension 18 is arranged between the transparent cover 14 and the respective lamp units 20, 30 such that, when the vehicle headlamp 1 is viewed from the front side, a space surrounding the focused-beam lamp unit 20 and the diffused-beam lamp unit 30 is covered by the extension 18.

The support member 15 is a plate member that generally conforms to the external shape of the transparent cover 14, and is supported by the lamp body 12 via an aiming mechanism 5 and a leveling mechanism 8 such that the support member 15 can be inclined in the vertical direction and the horizontal direction.

The aiming mechanism 5 is configured such that the positions and the orientations of the focused-beam lamp unit 20 and the diffused-beam lamp unit 30 can be finely adjusted by adjusting the fastening of the aiming nuts 6. This aiming adjustment is carried out such that an optical axes Ax1 of the focused-beam lamp unit 20 and an optical axis Ax2 of the diffused-beam lamp unit 30 extend substantially parallel to the front-rear direction of the vehicle on which the vehicle headlamp 1 is mounted. The leveling mechanism 8 is configured such that irradiation directions of the focused-beam lamp unit 20 and the diffused-beam lamp unit 30 can be automatically adjusted by driving a leveling motor 10 in accordance with changes in the number of passengers, the weight of loads on the vehicle, or the like.

As shown in FIGS. 1 and 2, the focused-beam lamp unit 20 is a direct projection type projector unit, and has a semiconductor light emitting device 22 disposed on the optical axis Ax1, a projection lens 21 disposed in front of the semiconductor light emitting device 22 and serving as an optical member for forwardly projecting light from the semiconductor light emitting device 22, and a shade 25 disposed in front of the semiconductor light emitting device 22 to shield a part of light from the semiconductor light emitting device 22.

The projection lens 21 is a planoconvex lens having a spherical convex front surface and a flat rear surface, and forwardly projects an image on its focal plane including its rear focal point Fa as an inverted image. The projection lens 21 is fixedly supported by a distal portion of a lens holder 24 provided on the front surface of the support member 15, and the shade 25 is fixed on a base portion of the lens holder 24.

Heat dissipating fins 26 are provided to protrude from the rear surface of the support member 15, and heat generated by the semiconductor light emitting device 22 is dissipated by the heat dissipating fins 26 and a cooling fan 27 disposed behind the heat dissipating fins 26.

The semiconductor light emitting device 22 is configured such that four light emitting chips (white light emitting diodes) each being approximately 1 mm square are arranged side-by-side on a substrate 23 so as to form a rectangular light emitting surface 22*a*.

The substrate 23 of the semiconductor light emitting device 22 is disposed on the front surface of the support member 15 at a portion on the optical axis Ax1 and behind the rear focal point Fa of the projection lens 21 so that the irradiation axis of the light emitting surface 22*a* is parallel to the optical axis Ax1.

The semiconductor light emitting device 22 is disposed such that the lower long side of the light emitting surface 22*a* is positioned on the rear focal point Fa of the projection lens 21 and such that the light emitting surface 22*a* extends along the horizontal axis Hx which is perpendicular to the optical axis Ax1 (i.e., the angle of the long sides of the light emitting surface 22*a* with respect to the horizontal axis Hx is smaller than 45°). The lighting of the semiconductor light emitting device 22 is controlled by a lighting controller.

A top edge portion 25*a* of the shade 25 covers a bottom-right corner portion of the light emitting surface 22*a* in a trapezoidal manner when viewed from the front side to form an oblique cutoff line and a horizontal cutoff line of a low-beam light distribution pattern.

Figure 4A:
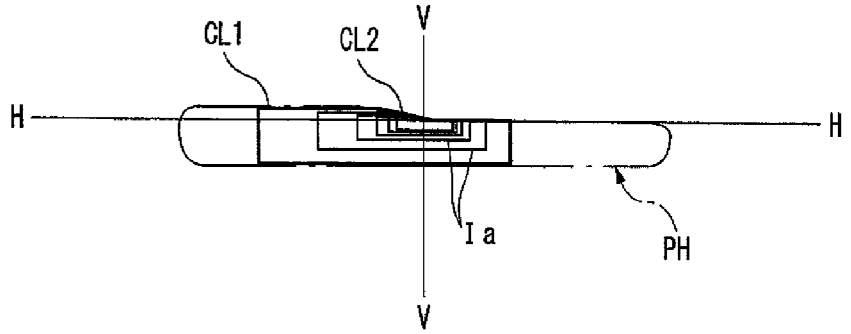
FIG. 4A is a perspective diagram illustrating a focused light distribution pattern projected on a virtual vertical screen, which is located 25 m ahead of the vehicle headlamp, from a focused-beam lamp unit of the vehicle headlamp.

More specifically, according to the focused-beam lamp unit 20, light emitted from the semiconductor light emitting device 22 and partially shielded by the shade 25 is projected forward by the projection lens 21 as a plurality of light source images Ia of the light emitting surface 22*a* to form a hot zone forming pattern PH (a focused beam pattern) having a horizontal cutoff line CL1 and an oblique cutoff line CL2 at the top edge (see FIG. 4A).

The horizontal cutoff line CL1 and the oblique cutoff line CL2 of the hot zone forming pattern PH may be formed by forming a light shield film directly on a portion of the light emitting surface 22*a*, instead of using the shade 25.

As shown in FIGS. 1 and 3, the diffused-beam lamp unit 30 is a direct projection type projector unit, and has a semiconductor light emitting device 32 disposed on the lamp optical axis Ax2, and a projection lens 31 disposed in front of the semiconductor light emitting device 32 and serving as an optical member for forwardly projecting light from the semiconductor light emitting device 32.

The projection lens 31 is a planoconvex lens having an ellipsoidal convex front surface and a flat rear surface, and forwardly projects an image on its focal plane including its rear focal point Fb as an inverted image such that the image is expanded it in the horizontal direction. The projection lens 31 is fixedly supported by a distal portion of a lens holder 34 provided on the front surface of the support member 15.

Heat dissipating fins 36 are provided to protrude from the rear surface of the support member 15, and heat generated by the semiconductor light emitting device 322 is dissipated by the heat dissipating fins 36 and a cooling fan 37 disposed behind the heat dissipating fins 36.

Like the semiconductor light emitting device 22 of the focused-beam lamp unit 20, the semiconductor light emitting device 32 is configured such that four light emitting chips (white light emitting diodes) each being approximately 1 mm square are arranged side-by-side on a substrate 33 so as to form a rectangular light emitting surface 32*a*.

The substrate 33 of the semiconductor light emitting device 32 is disposed on the front surface of the support member 15 at a portion on the optical axis Ax2 and behind the rear focal point Fb of the projection lens 31 so that the irradiation axis of the light emitting surface 32*a* is parallel to the lamp optical axis Ax2. The semiconductor light emitting device 32 is disposed such that the lower short side of the light emitting surface 22*a* is positioned on the rear focal point Fb of the projection lens 31 and such that the light emitting surface 32*a* extends along the vertical axis Vx which is perpendicular to the lamp optical axis Ax2 (i.e., the angle of the long sides of the light emitting surface 32*a* with respect to the horizontal axis Hx is equal to or larger than 45°). The lighting of the semiconductor light emitting device 32 is controlled by the lighting controller.

According to the diffused-beam lamp unit 30, light emitted from the semiconductor light emitting device 32 is projected forward by the projection lens 31 as a plurality of light source images Ib of the light emitting surface 32*a* to form, below the H-H line, a diffused region forming pattern PW (a diffused beam pattern) that is diffused (expanded) in the horizontal direction (see FIG. 4B).

Figure 4B:
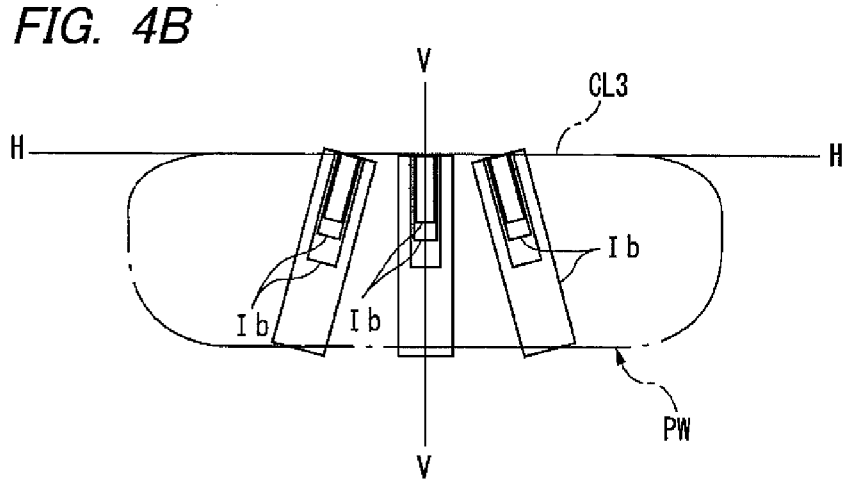
FIG. 4B is a perspective diagram illustrating a diffused light distribution pattern projected on the virtual vertical screen from a diffused-beam lamp unit of the vehicle headlamp.
Figure 4C:
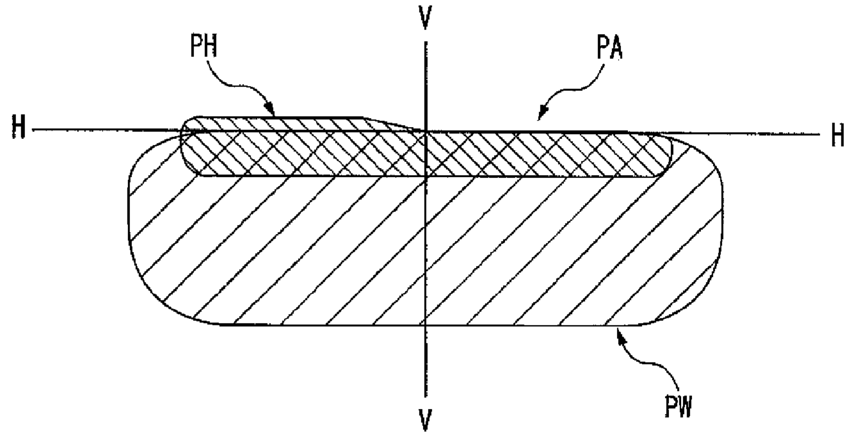
FIG. 4C is a perspective diagram illustrating a low-beam light distribution pattern formed by combining the focused light distribution pattern and the diffused light distribution pattern.

FIGS. 4A to 4C show light distribution patterns projected on a virtual vertical screen, which is located 25 m ahead of the vehicle headlamp 1, from the vehicle headlamp 1. FIG. 4A illustrates how the light source images Ia are superimposed to form the hot zone forming pattern PH. FIG. 4B illustrates how the light source images Ib are superimposed to form the diffused region forming pattern PW. FIG. 4C illustrates a low-beam light distribution pattern which is a combined light distribution pattern formed by superimposing the hot zone forming pattern PH and the diffused region forming pattern PW.

As shown in FIG. 4A, the hot zone forming pattern PH is formed as a vertically narrow focused beam pattern by the plurality of light source images Ia which are longer in the horizontal direction and including projections of the long sides of the light emitting surface 22*a* of the focused-beam lamp unit 20 that extend along a central horizontal line (the horizontal line on or near a forward vanishing point H-V) in front of the vehicle.

Therefore, the hot zone forming pattern PH in which the light source images Ia are gathered near the cutoff line to form a hot zone is less prone to cause irregularity in light intensity in the vehicle width direction and prevents a region below the hot zone from being excessively bright.

As shown in FIG. 4B, the diffused region forming pattern PW is formed as a vertically wide diffused beam pattern by the plurality of light source images Ib, at least one of which is longer in the vertical direction and including projections of the short sides of the light emitting surface 22*a* of the diffused-beam lamp unit 30 that extend along the central horizontal line.

Therefore, it is not necessary to control both of horizontal light diffusion and vertical light diffusion by means of the projection lens 31, i.e., a diffused beam pattern can be controlled only by control in the horizontal direction (the vehicle width direction).

In the diffused region forming pattern PW formed by the diffused-beam lamp unit 30, even if a vertically long light source image Ib projected with diffusion in the horizontal direction is rotated, only a small part of its top short side protrudes above a horizontal cutoff line CL3.

Therefore, a region of the low-beam light distribution pattern PA near the horizontal cutoff line CL3 of the diffused region forming pattern PW can be made bright, while maintaining the horizontal cutoff line CL3 clear.

As a result, as shown in FIG. 4C, a suitable low-beam light distribution pattern PA can be provided by forming a combined light distribution pattern as a superimposition of the hot zone forming pattern PH and the diffused region forming pattern PW.

Thus, the vehicle headlamp 1 is superior in that it enables a simple light distribution control and is less prone to cause irregularity in light intensity.

According to the vehicle headlamp 1 described above, the hot zone forming pattern PH is formed by the light source images Ia, including a light source image Ia that is longer in the horizontal direction than in the vertical direction and is parallel to the central horizontal line in front of the vehicle, and the diffused region forming pattern PW is formed by the light source images Ib, including a light source image Ib that is longer in the vertical direction than in the horizontal direction and is parallel to the central vertical line (on or near the forward vanishing point H-V) in front of the vehicle. However, according to one or more embodiments of the present invention, the light source images Ia and the light source images Ib need not necessarily be parallel to the central horizontal line or to the central vertical line, and may be inclined with respect to the central horizontal line or the central vertical line.

Figure 5:
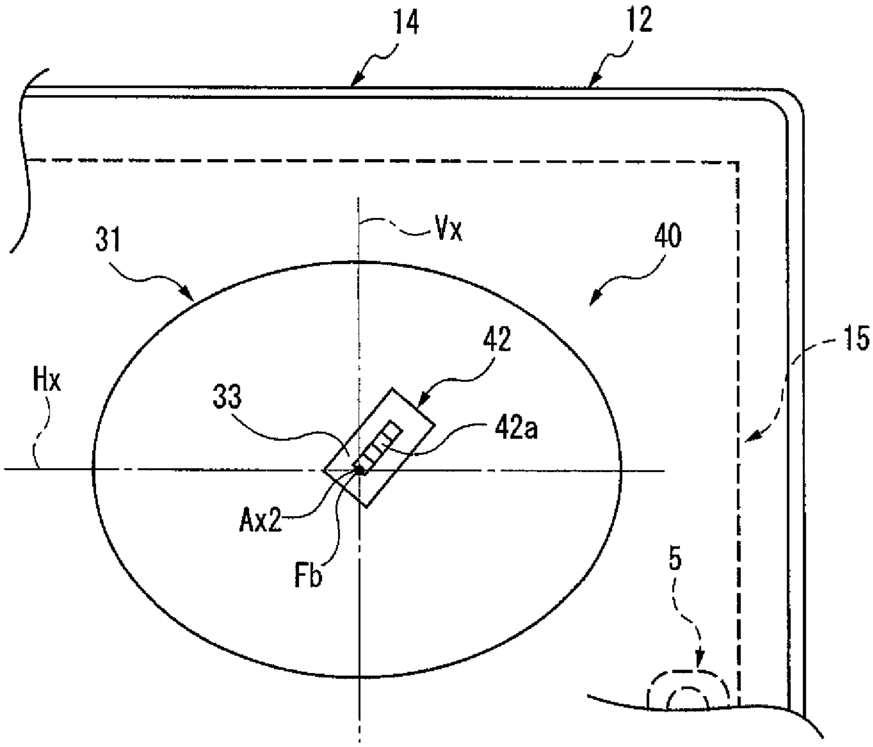
FIG. 5 is an enlarged front view of a portion of a diffused-beam lamp unit, which is a modified example of the diffused-beam lamp unit of FIG. 1.

A diffused-beam lamp unit 40 shown in FIG. 5 is a modified example of the diffused-beam lamp unit 30 of the vehicle headlamp 1 described above. Components similar to those of the diffused-beam lamp unit 30 will be given the same reference numerals and will not be described in detail.

The diffused-beam lamp unit 40 is a direct projection type projector unit that is similar to the diffused-beam lamp unit 30, and has a semiconductor light emitting device 42 disposed on the lamp optical axis Ax2 and a projection lens 31 disposed in front of the semiconductor light emitting device 42 and serving an optical member for forwardly projecting light from the semiconductor light emitting device 42.

The semiconductor light emitting device 42 is disposed so as to be longer in the vertical direction such that the lower short side of a light emitting surface 42*a* is positioned on the rear focal point Fb of the projection lens 31 and such that the light emitting surface 42*a* extends toward a top-right in FIG. 5, that is, inclined with respect to the vertical line Vx which is perpendicular to the lamp optical axis Ax2.

Figure 6:
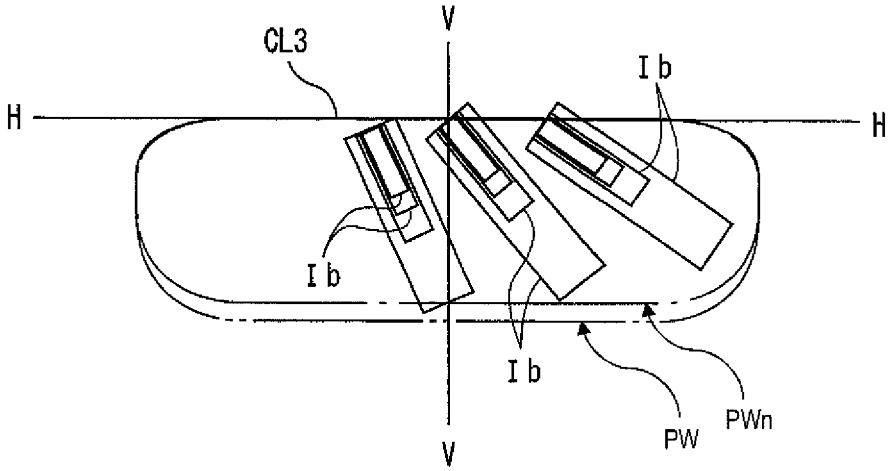
FIG. 6 is a perspective diagram illustrating a diffused light distribution pattern formed by the diffused-beam lamp unit of FIG. 5.

In the diffused-beam lamp unit 40, light emitted from the semiconductor light emitting device 42 is projected forward by the projection lens 31 to produce a plurality of light source images Ib of the light emitting surface 42*a* which form, below the H-H line, a diffused region forming pattern PWn that is diffused (expanded) in the horizontal direction (indicated by a one-dot chain line in FIG. 6).

The diffused region forming pattern PWn is a diffused beam pattern that is narrower in the vertical direction than the diffused region forming pattern PW (indicated by a two-dot chain line in FIG. 6) formed by the diffused-beam lamp unit 30.

In this manner, the vertical width of a diffused region forming pattern PW can easily be reduced without using another projection lens having a long focal length by forming a diffused region forming pattern PWn by light source images Ib including projections of the short sides of the light emitting surface 42*a* that are inclined with respect to the central horizontal line.

Thus, the vehicle headlamp according to this medication is so high in the degree of freedom of designing as to be able to accommodate different mounting positions and lamp installation spaces of various vehicle types.

Figure 7A:
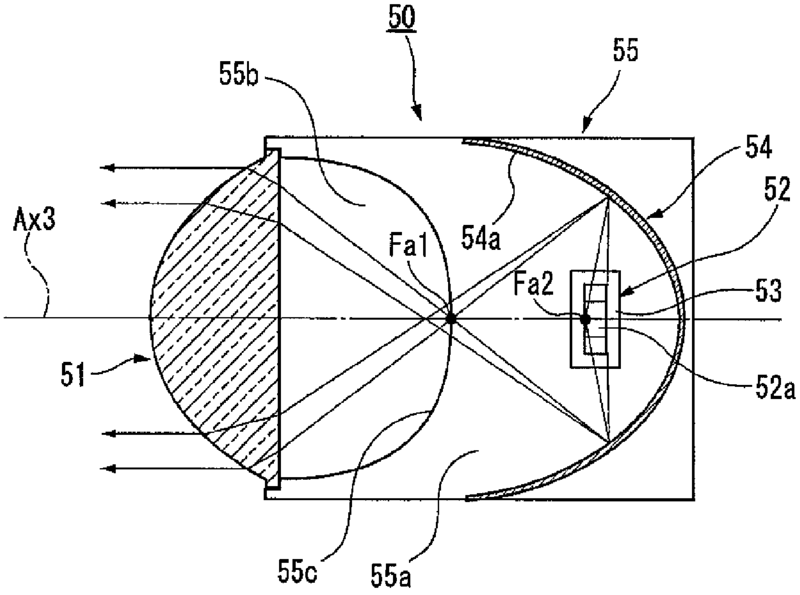
FIG. 7A is a horizontal sectional view of a focused-beam lamp unit according to one or more embodiments of the present invention.
Figure 7B:
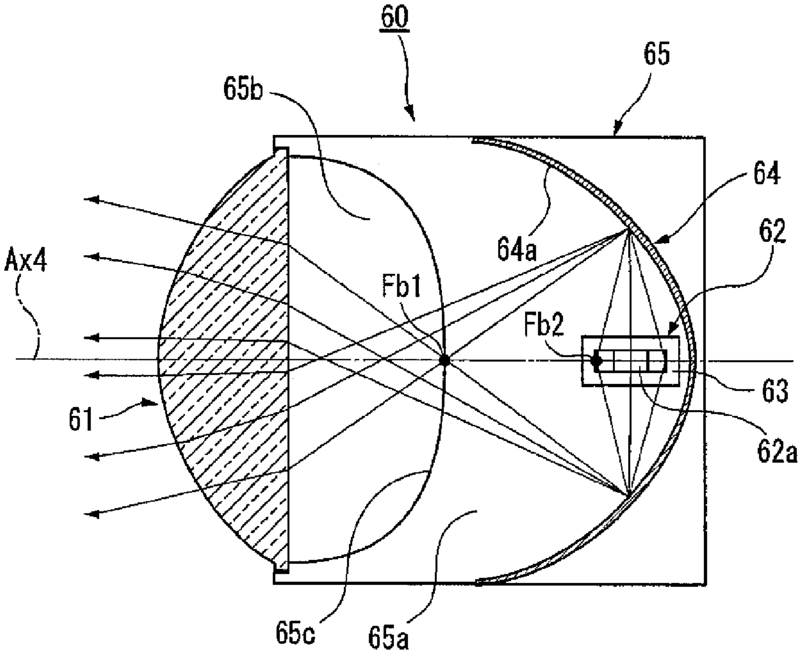
FIG. 7B is a horizontal sectional view of a diffused-beam lamp unit according to one or more embodiments of the present invention.

FIGS. 7A and 7B are horizontal sectional views of a focused-beam lamp unit 50 and a diffused-beam lamp unit 60, respectively, of a vehicle headlamp according to one or more embodiments of the present invention.

As shown in FIG. 7A, the focused-beam lamp unit 50 is a reflection type projector unit, and includes a projection lens 51 disposed on the optical axis Ax3 extending in the vehicle front-rear direction, a semiconductor light emitting device 52 disposed behind the projection lens 51, a reflector 54 configured to forwardly reflect light from the semiconductor light emitting device 52 toward the optical axis Ax3, and a shade 55 disposed between the projection lens 51 and the semiconductor light emitting device 52 and serving to form a cutoff line of a low-beam light distribution pattern.

Like the semiconductor light emitting device 22 of the focused-beam lamp unit 20, the semiconductor light emitting device 52 is configured such that four light emitting chips (white light emitting diodes) each being approximately 1 mm square are arranged side-by-side on a substrate 53 so as to form a rectangular light emitting surface 52*a*.

The substrate 53 of the semiconductor light emitting device 52 is disposed behind a rear focal point Fa1 of the projection lens 51 such that the irradiation axis of the light emitting surface 52*a* is directed upward in the vertical direction. Furthermore, the semiconductor light emitting device 52 is disposed such that the front long side of the light emitting surface 52*a* is positioned on a first focal point Fa2 of the reflector 54 and such that the light emitting surface 52*a* extends along the horizontal axis that is perpendicular to the optical axis Ax3. The lighting of the semiconductor light emitting device 52 is controlled by a lighting controller.

The reflector 54 is a generally dome-shaped member disposed above the semiconductor light emitting device 52, and has a reflecting surface 54*a* configured to forwardly reflect light from the semiconductor light emitting device 52 so as to be converged toward the optical axis Ax3.

The reflecting surface 54*a* has an ellipsoidal shape having the optical axis Ax3 as the center axis. More specifically, the reflecting surface 54*a* is shaped such that the eccentricity of its elliptical cross section taken along a plane including the optical axis Ax3 increases gradually as the plane is rotated from vertical orientation to horizontal.

The semiconductor light emitting device 52 is disposed such that its front long side is positioned on the first focal point Fa2 of the ellipse as the vertical cross section of the reflecting surface 54*a*. As a result, the reflecting surface 54*a* reflects light from the semiconductor light emitting device 52 forward so as to be converged toward the optical axis Ax3. In the vertical plane including the optical axis Ax3, the reflecting surface 54*a* causes light from the semiconductor light emitting device 52 to converge approximately at a second focal point of the ellipse where the rear focal point Fa1 of the projection lens 51 is located.

The projection lens 51 is a planoconvex lens having a spherical convex front surface and a flat rear surface, and is disposed on the optical axis Ax3 such that its rear focal point Fa1 is located at the second focal point of the reflecting surface 54*a* of the reflector 54. Thus, the projection lens 51 forwardly projects an image on its focal plane including the rear focal point Fa1 as an inverted image.

The shade 55 is a block member and also serves as a holder for the projection lens 51 and the semiconductor light emitting device 52, and is mounted with the reflector 54. Heat dissipating fins (not shown) are provided to protrude from the rear surface of the shade 55 to radiate heat generated by the semiconductor light emitting device 52.

Furthermore, in the shade 55, a top surface 55*a* which extends from a light shield edge 55*c* rearward in the direction of the optical axis Ax3 upwardly reflects a part of light reflected by the reflector 54. That is, the top surface 55*a* is formed with an auxiliary reflecting surface.

The shade 55 is configured such that the light shield edge 55*c* (i.e., the ridge line between the top surface 55*a* and a front end surface 55*b* of the shade 55) passes the rear focal point Fa1 of the projection lens 51.

Because the auxiliary reflecting surface formed on the top surface 55*a* upwardly reflects a part of light reflected by the reflector 54, light that would otherwise be shielded by the shade 55 is used effectively as illumination light and the efficiency of utilization of light from the semiconductor light emitting device 52 is thereby increased.

To conform to the curvature field of the projection lens 51, the light shield edge 55*c* of the shade 55 is curved such that its left and right side portions project forward. The curved light shield edge 55*c* coincides with a line of focal points of the projection lens 51. That is, the light shield edge 55*c* of the shade 55 extends along the line of focal points of the projection lens 51 and provides the cutoff line shape.

That is, in the focused-beam lamp unit 50, light reflected from the reflector 54 and partially shielded by the shade 55 is projected forward by the projection lens 51 as a plurality of light source images Ia of the light emitting surface 52*a* to form a hot zone forming pattern having a horizontal cutoff line CL1 and an oblique cutoff line CL2 at the top, like the hot zone forming pattern PH shown in FIG. 4A.

This hot zone forming pattern is formed as a vertically narrow focused beam pattern by the light source images Ta which are longer in the horizontal direction and including projections of the long sides of the light emitting surface 52*a* of the focused-beam lamp unit 50 that extend along a central horizontal line located on the front side of the vehicle. Therefore, the hot zone forming pattern is less prone to cause irregularity in light intensity in the vehicle width direction and prevents a region below the hot zone from being excessively bright.

As shown in FIG. 7B, the diffused-beam lamp unit 60 is a reflection type projector unit, and includes a projection lens 61 disposed on the optical axis Ax4 extending in the vehicle front-rear direction, a semiconductor light emitting device 62 disposed behind the projection lens 61, a reflector 64 configured to forwardly reflect light emitted the semiconductor light emitting device 62 toward the optical axis Ax4, and a shade 65 disposed between the projection lens 61 and the semiconductor light emitting device 62 and serving to form a cutoff line of a low-beam light distribution pattern.

Like the semiconductor light emitting device 22 of the focused-beam lamp unit 20, the semiconductor light emitting device 62 is configured such that four light emitting chips (white light emitting diodes) each being approximately 1 mm square are arranged side-by-side on a substrate 63 so as to form a rectangular light emitting surface 62*a*.

The substrate 63 of the semiconductor light emitting device 62 is disposed behind a rear focal point Fb1 of the projection lens 61 such that the irradiation axis of the light emitting surface 62*a* is directed upward in the vertical direction. Furthermore, the semiconductor light emitting device 62 is disposed such that the front short side of the light emitting surface 62*a* is positioned on a first focal point Fb2 of the reflector 64 and such that the light emitting surface 62*a* extends along the optical axis Ax4. The lighting of the semiconductor light emitting device 62 is controlled by the lighting controller.

The reflector 64 is a generally dome-shaped member disposed above the semiconductor light emitting device 62, and has a reflecting surface 64*a* configured to forwardly reflect light from the semiconductor light emitting device 62 so as to be converged toward the optical axis Ax4.

The reflecting surface 64*a* has an ellipsoidal shape having the optical axis Ax4 as the center axis. More specifically, the reflecting surface 64*a* is shaped such that the eccentricity of its elliptical cross section taken along a plane including the optical axis Ax4 increases gradually as the plane is rotated from vertical orientation to horizontal.

The semiconductor light emitting device 62 is disposed such that its front short side is positioned on the first focal point Fa2 of the ellipse as the vertical cross section of the reflecting surface 64*a*. As a result, the reflecting surface 64*a* forwardly reflects light from the semiconductor light emitting device 62 so as to be converged toward the optical axis Ax4. In the vertical plane including the optical axis Ax4, the reflecting surface 64*a* causes light from the semiconductor light emitting device 62 to converge approximately at a second focal point of the ellipse where the rear focal point Fa1 of the projection lens 61 is located.

The projection lens 61 is a planoconvex lens having an ellipsoidal convex front surface and a flat rear surface, and is disposed on the optical axis Ax4 such that its rear focal point Fb1 is located at the second focal point of the reflecting surface 64*a* of the reflector 64. Thus, the projection lens 61 forwardly projects an image on its focal plane including the rear focal point Fb1 as an inverted image while expanding the image in the horizontal direction.

The shade 65 is a block member and also serves as a holder for the projection lens 61 and the semiconductor light emitting device 62, and is mounted with the reflector 64. Heat dissipating fins (not shown) are provided to protrude from the rear surface of the shade 65 to radiate heat generated by the semiconductor light emitting device 62.

Furthermore, in the shade 65, a top surface 65*a* which extends from a light shield edge 65*c* rearward in the direction of the optical axis Ax4 upwardly reflects a part of light reflected by the reflector 64. The top surface 65*a* is formed with an auxiliary reflecting surface.

The shade 65 is shaped such that the light shield edge 65*c* (i.e., the ridge line between the top surface 65*a* and a front end surface 65*b* of the shade 65) passes the rear focal point Fb1 of the projection lens 61.

Because the auxiliary reflecting surface formed on the top surface 65*a* upwardly reflects a part of light reflected by the reflector 64, light that would otherwise be shielded by the shade 65 is used effectively as illumination light and the efficiency of utilization of light emitted the semiconductor light emitting device 62 is thereby increased.

To conform to the curvature field of the projection lens 61, the light shield edge 65*c* of the shade 65 is curved such that its left and right side portions project forward. The curved light shield edge 65*c* coincides with a line of focal points of the projection lens 61. That is, the light shield edge 65*c* of the shade 65 extends along the line of focal points of the projection lens 61 and provides the cutoff line shape.

That is, in the diffused-beam lamp unit 60, light reflected from the reflector 64 and partially shielded by the shade 65 is projected forward by the projection lens 61 as a plurality of light source images Ib of the light emitting surface 62*a* to form a diffused region forming pattern that has a horizontal cutoff line CL3 at the top edge and is diffused (expanded) in the horizontal direction below the H-H line.

This diffused region forming pattern is formed as a vertically wide diffused beam pattern by the light source images Ib, at least one of which is longer in the vertical direction and including projections of the short sides of the light emitting surface 62*a* of the diffused-beam lamp unit 60 that extend along the central horizontal line located on the front side of the vehicle. Therefore, it is not necessary to control both of horizontal light diffusion and vertical light diffusion by means of the projection lens 61 and the reflector 64, i.e., a diffused beam pattern can be controlled only by control in the horizontal direction.

Furthermore, in the diffused-beam lamp unit 60, a cutoff line is formed by the shade 65 at the top edge of a diffused region forming pattern and hence this diffused region forming pattern has a better horizontal cutoff line CL3 than a diffused region forming pattern PW formed by the diffused-beam lamp unit 30.

Thus, the vehicle headlamp having the focused-beam lamp unit 50 and the diffused-beam lamp unit 60 is also superior in that it enables a simple light distribution control and is less prone to cause irregularity in light intensity.

A direct projection type projector unit, e.g., the focused-beam lamp unit 20 and the diffused-beam lamp unit 30, is advantageous than a reflection type projector unit, e.g., the focused-beam lamp unit 50 and the diffused-beam lamp unit 60, in that it has a smaller front-rear dimension. However, according to the focused-beam lamp unit 50 and the diffused-beam lamp unit 60, the light source images Ia and Ib to be projected forward are controlled by the optical members including the projection lenses 51 and 61 and the reflectors 54 and 64, which makes it easier to control a light distribution pattern.

While the invention has been described with respect to a limited number of embodiments, those skilled in the art, having benefit of this disclosure, will appreciate that other embodiments can be devised without departing from the scope of the invention as defined by the appended claims. For example, the specific structures/configurations of semiconductor light emitting devices, the optical members such as the projection lenses, the focused-beam lamp unit, the diffused-beam lamp unit, etc. of the vehicle headlamp are not limited to those described above.

More specifically, for example, although the vehicle headlamp described above uses the white light emitting diodes as the semiconductor light emitting devices, other kinds of surface light emitting devices, such as a laser diode, may be used. Further, the projection lens 31, 61 is not limited to the planoconvex lens having an ellipsoidal convex front surface and a flat rear surface. For example, other kinds of projection lenses having various shapes such as a cylindrical lens or an aspherical lens whose incidence surface and exit surface are each a free surface can be used as long as they can produce exit light that is diffused in the horizontal direction. Where an aspherical lens whose incidence surface and exit surface are each a free surface is used as a projection lens, according to one or more embodiments of the present invention, the incidence surface and the exit surface project light coming from a light source somewhat downward rather than horizontally and to project light coming from the light source so as to diffuse it more widely in the horizontal direction than in the vertical direction.

Although an oblique cutoff line and a horizontal cutoff line of a low-beam light distribution pattern are formed by disposing the shade 25 in front of the semiconductor light emitting device 22 in the embodiment described above, similar oblique and horizontal cutoff lines may be formed by controlling the deflection of light coming from a light source by suitably designing the lens surfaces of a projection lens without disposing a shade in front of the light source.

As an optical member for projecting forward light from the semiconductor light emitting device, a reflector having any of various kinds of reflecting surfaces such as a parabolic reflecting surface, a hyperboloidal reflecting surface, or combined reflecting surfaces can be used.

Although the vehicle headlamp described above is configured to form a low-beam light distribution pattern, the present invention is not limited thereto. For example, one or more embodiments of the present invention can also be applied to a vehicle headlamp for forming a high-beam light distribution pattern by combining a focused-beam lamp unit and a diffused-beam lamp unit.

In one or more embodiment described above, the focused-beam lamp unit is configured to form the hot zone forming pattern PH (a focused beam pattern) and the diffused-beam lamp unit is configured to form the diffused region forming pattern PW (a diffused beam pattern). The focused-beam lamp unit and the diffused-beam lamp unit are both a direct projection type projector unit or a reflection type projector unit. However, a reflection type projector unit may be used to faint the hot zone forming pattern PH while using a direct projection type projector unit to form the diffused region forming pattern PW. Alternatively, a direct projection type projector unit may be used to form the hot zone forming pattern PH while using a reflection type projector unit to form the diffused region forming pattern PW.

What is claimed is:

1. vehicle headlamp comprising:

a focused-beam lamp unit; and a diffused-beam lamp unit, wherein the focused-beam lamp unit comprises:

a first semiconductor light emitting device having a first rectangular light emitting surface; and a first optical member that projects light from the first semiconductor light emitting device forward from the focused-beam lamp unit to form a focused beam pattern, wherein the diffused-beam lamp unit comprises:

a second semiconductor light emitting device having a second rectangular light emitting surface; and a second optical member that projects light from the second semiconductor light emitting device forward from the diffused-beam lamp unit to form a diffused beam pattern, the diffused beam pattern being wider than the focused beam pattern in a direction along a vertical line in front of a vehicle on which the vehicle headlamp is mounted, wherein the focused-beam lamp unit and the diffused-beam lamp unit are arranged to form a light distribution pattern by combining the focused beam pattern and the diffused beam pattern, wherein the focused-beam lamp unit is configured to form the focused beam pattern by a plurality of first light source images of the first rectangular light emitting surface, at least one of the first light source images being longer in a direction along a laterally extending horizontal line in front of the vehicle than in the direction along the vertical line, wherein the diffused-beam lamp unit is configured to form the diffused beam pattern by a plurality of second light source images of the second rectangular light emitting surface, wherein the second rectangular light emitting surface emits light forming only the plurality of second light source images when the light is projected by the second optical member, and wherein each of the plurality of second light source images is longer in the direction along the vertical line than in the direction along the horizontal line.

2. The vehicle headlamp according to claim 1, wherein the at least one of the first light source images comprises a first projection of a long side of the first rectangular light emitting surface, the first projection extending in the direction along the horizontal line.

3. The vehicle headlamp according to claim 1, wherein the at least one of the second light source images comprises a second projection of a short side of the second rectangular light emitting surface, the second projection extending in the direction along the horizontal line.

4. The vehicle headlamp according to claim 1, wherein the first semiconductor light emitting device is disposed such that the first rectangular light emitting surface is longer in a direction along a first horizontal axis than in a direction perpendicular to the first horizontal axis, wherein the first horizontal axis is perpendicular to an optical axis of the focused-beam lamp unit, and wherein the second semiconductor light emitting device is disposed such that the second rectangular semiconductor light emitting surface is longer in a direction perpendicular to a second horizontal axis than in a direction along the second horizontal axis, wherein the second horizontal axis is perpendicular to an optical axis of the diffused-beam lamp unit.

5. The vehicle headlamp according to claim 1, wherein at least one of the first optical member and the second optical member is a projection lens.

6. The vehicle headlamp according to claim 5, wherein at least one of the first rectangular light emitting surface and the second rectangular light emitting surface is oriented to face forward.

7. The vehicle headlamp according to claim 1, wherein the light distribution pattern is a low-beam light distribution pattern.

* * * * *